United States Patent Office 3,515,079
Patented June 2, 1970

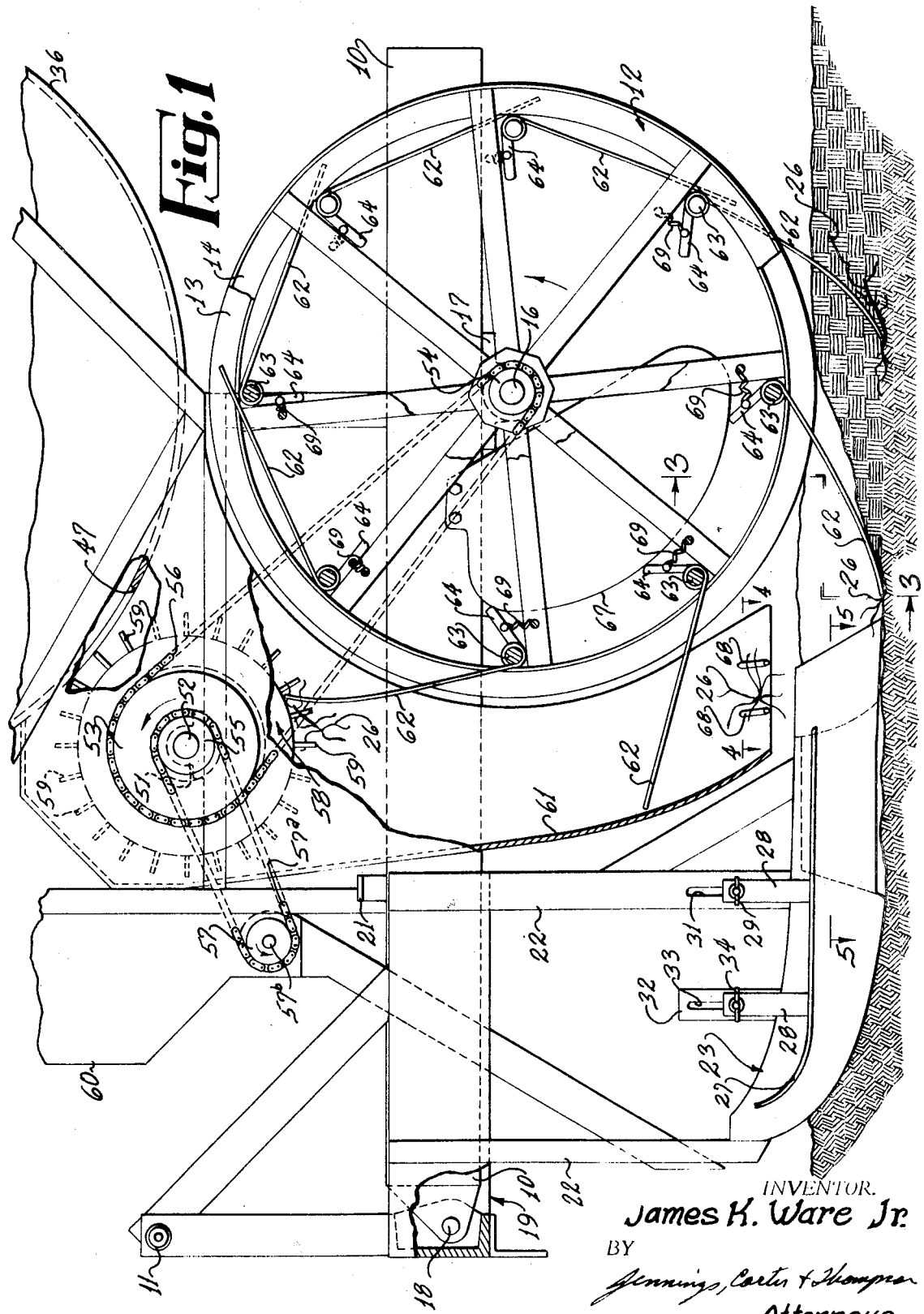

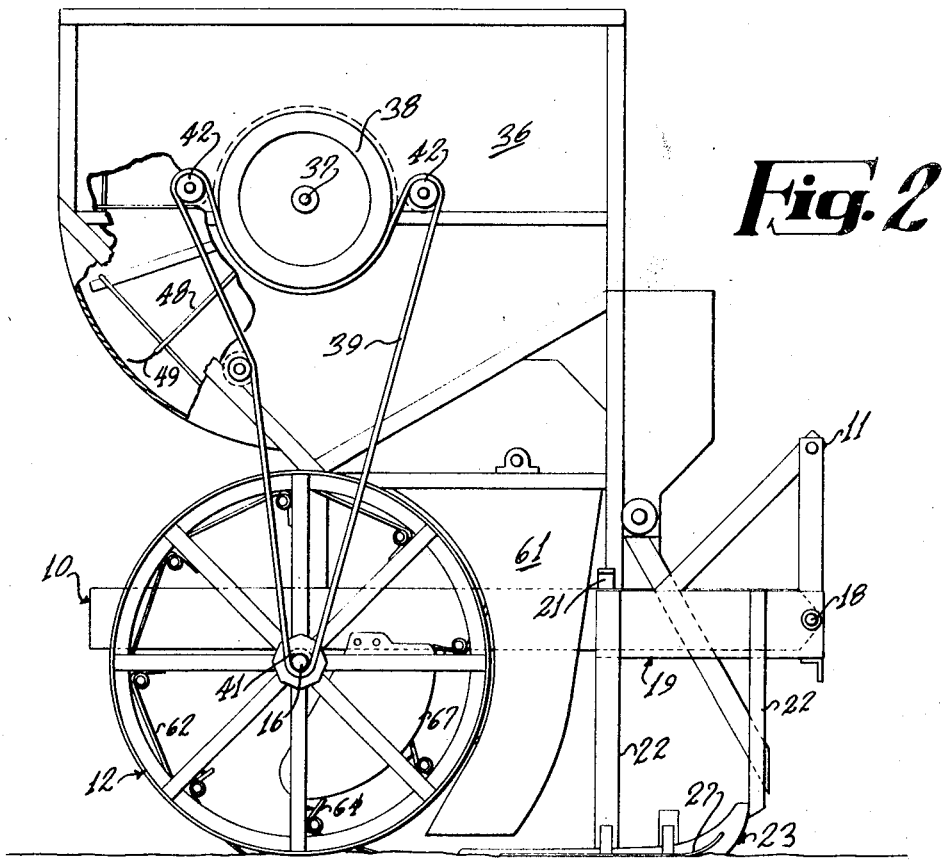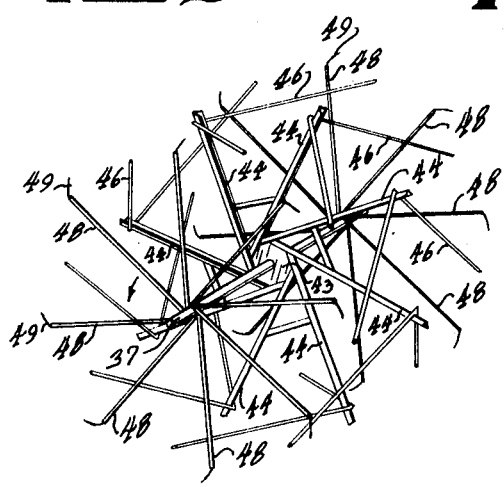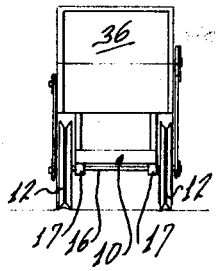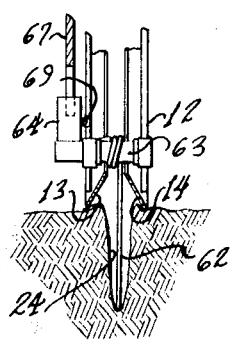

3,515,079
SPRIG PLANTER
James K. Ware, Jr., Rte. 4, Box 105-C,
Columbus, Miss. 39701
Filed Sept. 18, 1967, Ser. No. 668,513
Int. Cl. A01c 11/02; B65h 3/02
U.S. Cl. 111—3                                                 7 Claims

ABSTRACT OF THE DISCLOSURE

A sprig planter having a rotatable member mounted rearwardly of a furrow opener. Elongated fingers are pivotally mounted on the rotatable member and move from a position inwardly of the rotatable member to a position outwardly thereof to press sprigs sequentially into the soil. A rearwardly opening sprig supply housing encases the fingers at the downgoing side of the rotatable member. Sprigs are delivered to the supply housing in a uniform manner so that the fingers move the sprigs sequentially into the furrow.

This invention relates to a sprig planter and more particularly to such a planter which shall be fully automatic to plant successive sprigs in a continuous manner.

An object of my invention is to provide a sprig planter of the character designated which plants the sprigs at a predetermined depth and then covers the sprigs without excessive packing whereby a very high percentage of the sprigs live after being planted.

A primary object of my invention is to provide a sprig planter of the character designated which shall include improved means to plant the sprigs at the same depth in the ground, regardless of the contour of the ground.

Another object of my invention is to provide a sprig planter of the character designated in which the furrow opening for receiving the sprigs is of a minimum width whereby there is a minimum disturbance of the seedbed.

Another object of my invention is to provide a sprig planter which shall be adapted to space the sprigs accurately at predetermined intervals whereby all sprigs are spaced equal distances apart.

A further object of my invention is to provide a sprig planter of the character designated which shall be positive in operation to press each sprig into the soil at the bottom of the furrow therefor.

A still further object of my invention is to provide a sprig planter of the character designated which is especially adapted for planting small sprigs.

BACKGROUND OF THE INVENTION

As is well known in the art to which my invention relates, difficulties have been encountered in planting sprigs in a uniform manner due to the fact that the sprigs are not all positioned at the same depth relative to the surface of the ground. Also, furrows heretofore employed have been relatively wide whereby the soil has been excessively disturbed, thus making it difficult to seal and protect the sprigs. Also, no effective means has been provided for delivering the sprigs sequentially to the furrow at uniform intervals.

Apparatus embodying features of my invention is illustrated in the accompanying drawings, forming a part of this application, in which:

FIG. 1 is a side elevational view, partly broken away and in section, showing the apparatus in operation;

FIG. 2 is a side elevational view, partly broken away, showing the opposite side of the apparatus from that shown in FIG. 1;

FIG. 3 is a sectional view taken generally along the line 3—3 of the FIG. 1;

FIG. 4 is a sectional view taken along the line 4—4 of FIG. 1;

FIG. 5 is a sectional view taken along the line 5—5 of FIG. 1;

FIG. 6 is a perspective view showing the agitator for the sprig hopper and the rotary presser fingers which force sprigs through the passageway in the hopper; and, FIG. 7 is a rear elevational view of the apparatus, drawn to a smaller scale.

Referring now to the drawings for a better understanding of my invention, I show a translatable frame 10 supported by laterally spaced compacting wheels 12. Each wheel 12 is provided with outwardly flaring rim portions 13 and 14 which define a generally V-shaped groove in the periphery of the wheel 12 for compacting soil about the sprigs in a manner to be described hereinafter. The wheels 12 are mounted on an axle 16 which in turn is mounted for rotation in suitable bearings 17 carried by the frame 10.

Pivotally connected to the forward end of the translatable frame 10 by a pivot pin 18 is the forward end of a vertically movable frame 19 which is connected to a tractor or the like by a conventional hitch, indicated generally at 11. Upward movement of the frame 19 relative to the frame 10 is limited by laterally extending stop members 21 carried by the frame 10 in position to engage frame 19 after it moves upwardly a predetermined distance, as shown in FIG. 1. The frame 19 carries depending support members 22 at opposite sides thereof which are secured at their lower ends to laterally spaced sword-like members 23 which serve to open furrows 24 for receiving the sprigs 26. The depth that the sword-like member 23 penetrates the soil is determined by an adjustable depth plate 27 which extends in a horizontal plane. The depth plate 27 carries upstanding brackets 28 one of which is secured at selected positions to the depending members 22 by wing bolts 29. An elongated slot 31 is provided in the depending member 22 for receiving the wing bolt. The other bracket 28 is adjustably connected to an upstanding bracket 32 carried by the member 23. An elongated slot 33 is provided in the bracket 32 for receiving a wing bolt 34.

Mounted on the frame 10 at an elevation above the compacting wheels 12 is a sprig hopper 36. Mounted for rotation within the hopper 36 is a shaft 37. Secured nonrotatably to the shaft 37 outwardly of the hopper 36 is a sprocket 38 which is driven by a sprocket chain 39 that passes about a sprocket 41 carried by the shaft 16. The sprocket chain 39 also passes around idler sprockets 42 at opposite sides of the sprocket 38 whereby sprocket 38 is rotated in the direction of the arrow shown in FIG. 2.

Secured rigidly to the central portion of the shaft 37, as shown in FIG. 6, is a plate 43. Secured rigidly to the plate 43 by suitable means, such as by welding, are a plurality of radially extending arms 44 which are spaced angularly from each other, as shown in FIG. 6. Secured to the outer end of each arm 44 is a generally V-shaped agitator element 46. That is, each agitator element 46 comprises a pair of forwardly converging members which are joined to each other at the point of connection to the arm 44. By providing the forwardly converging agitator elements, the sprigs within the hopper 36 are directed outwardly toward opposite sides of the hopper.

Discharge passageways 47 are provided in the bottom of the hopper 36 adjacent opposite sides thereof. Secured to the shaft 37 in alignment with each discharge passageway 47 are a plurality of radially extending arms 48 which are spaced angularly from each other, as shown in FIG. 6. The outer end of each arm 48 carries a presser finger 49 which is adapted to press the sprigs through the openings 47 at opposite sides of the hopper 36 whereby the sprigs are discharged at a point upwardly and forwardly of the compacting wheels 12.

Extending transversely of the frame 10 and mounted for rotation in suitable bearings 51 is a shaft 52. A sprocket 53 is mounted on the shaft 52 and is connected in driving relation with a sprocket 54 mounted on the shaft 16 by a flexible drive chain 56. A drive sprocket 55 is mounted on shaft 52 and is connected in driving relation with a sprocket 57 by a chain 57a. The sprocket 57 is mounted on and drives a shaft 57b of a fertilizer distributor indicated generally at 60. Mounted on the shaft 52 in alignment with each of the laterally spaced openings 47 is a disc-like feed member 58 having radially extending teeth 59 spaced angularly from each other in position to remove the sprigs 26 from the openings 47. The peripheral speed of the teeth 59 is greater than the peripheral speed of fingers 49 whereby the sprigs are removed from the openings 47 in an efficient manner.

Mounted on the frame 10 and encasing each feed member 58 is a depending housing 61 which extends downwardly and rearwardly and terminates adjacent the rear end of the sword member 23, as shown in FIGS. 1 and 2. The rear side of each housing 61 is open, as shown in FIG. 1, adjacent the forward side of the compacting wheel 12. The upper end of each housing 61 communicates with the discharge passageway 47 for receiving the sprigs 26, as shown.

Elongated, resilient fingers 62 are pivotally mounted at angularly spaced locations on each compacting wheel 12, as shown in FIG. 1. That is, one end of each elongated finger 62 extends around and is secured to a shaft 63 which is mounted in suitable bearings carried by the compacting wheel 12 with the other end of the elongated finger 62 being disposed to move from a position inwardly of the compacting wheel 12 to a position outwardly thereof. Secured to each shaft 63 is an inwardly projecting actuating member 64 which is adapted to engage a cam member 67 carried by the frame 10. The cam member 67 is of a shape and in position to engage the actuating member 64 associated with each finger 62 at the downgoing side of the compacting wheel 12 to thus move the outer end of the finger 62 into engagement with the sprigs 26 carried by the feed member 58. The sprigs 26 are removed from the feed members 58 by the fingers 62 and then fall downwardly through the housing 61 whereby the elongated fingers 62 press successive sprigs into the soil at the bottom of the furrow 24.

Inwardly projecting retainer element 68 are mounted adjacent the lower end of the housing 61 in position to restrain discharge of the sprigs 26 from the lower end of the housing until the sprig is forced therefrom by an elongated member 62. The cam member 67 is also of a shape and in position to release the fingers 62 successively adjacent the lower portion of the compacting wheel 12 whereby each finger is free to move inwardly of the compacting wheel as the outer end thereof is removed from the soil. To return the fingers 62 to a position inwardly of the compacting wheel 12, I provide tension springs 69 between the compacting wheel 12 and the inwardly extending actuating members 64 of the fingers 62, as shown in FIG. 1. While each spring 69 is strong enough to return the elongated finger 62 to their inner position after leaving the soil, the spring is not strong enough to pull these fingers out of the soil during the planting operation whereby the soil is compacted around the sprigs in a uniform manner.

From the foregoing description, the operation of my improved sprig planter will be readily understood. Sprigs 26 of a desired length are placed in the hopper 36 and the depth plate 27 is adjusted relative to the sword member 23 whereby the furrow opened is of a predetermined depth. Since the furrow opening means is carried by the vertically movable frame 19 and its vertical position is determined by the adjustment of depth plate 27, the sword member 23 follows the contour of the ground whereby sprigs may be planted in fields which are not level and at the same time each sprig is planted at the same depth relative to the surface of the ground as the sprig is placed in the bottom of the furrow 24.

As the apparatus moves forwardly, the agitator elements 46 move within the hopper 36 to cause the sprigs to move outwardly toward opposite sides of the hopper and in alignment with the discharge openings 47. Since the presser fingers 49 rotate within the hopper 36 in alignment with the passageways 47, they force the sprigs through the passageways into engagement with the feed members 58. The angularly spaced fingers 59 carried by the feed member 58 remove the sprigs from openings 47 whereupon the sprigs fall downwardly and forwardly of the compacting wheel 12 and are positioned in alignment with fingers 62. Accordingly, sprigs 26 are successively engaged by the fingers 62 and transferred downwardly through the housing 61 whereupon they are then pressed into the soil at the bottom of the furrow 24 made by the furrow opening sword 23. That is, the cam 67 engages the actuating member 64 adjacent the inner end of each finger 62 whereby the finger is moved outwardly of the compacting wheel 12 to thus carry the sprig 26 downwardly to the bottom of the furrow 24 whereupon it is pressed into the soil. The cam member 67 releases the fingers 62 successively adjacent the lower portion of the compacting wheel 12 whereby the fingers 62 are returned to a position inwardly of the compacting wheel as the fingers are withdrawn from the soil. The compacting wheel 12 having a V-shaped groove in the periphery thereof causes the soil to be packed in a uniform manner about the sprigs 26. Each finger 62 remains within the confines of the compacting wheel 12 until it reaches the downgoing side of the compacting wheel whereupon its actuating member 64 engages the cam member 67 to start another cycle of operation. The elongated fingers 62 are urged into engagement with the sprigs 26 over a long length of the sprig so that a long linear contact is provided between the finger and the sprigs engaged thereby. By providing resilient fingers 62 which move into engagement with the sprigs, the sprigs are pressed in a uniform manner into the soil at the bottom of the furrow. The retainer elements 68 at the bottom of the rearwardly opening housing 61 prevent sprigs from falling into the furrow without being engaged by the fingers 62, thus assuring proper positioning of each sprig placed into the furrow.

From the foregoing it will be seen that I have devised an improved sprig planter which plants sprigs at a uniform depth in a relatively narrow furrow regardless of the contour of the field being planted. By providing means for delivering successive sprigs to the downgoing side of the compacting wheel 12, together with improved means for transferring successive sprigs to the bottom of the furrow, the sprigs are not only planted at a uniform depth but are spaced predetermined distances apart. Furthermore, by providing elongated fingers which engage the sprigs over a long length of the sprigs, a long linear contact is provided between the finger and the sprigs, thus assuring that a sprig is positioned properly within the furrow. Furthermore, by providing means for returning the fingers inwardly of the rotary compacting wheel as the fingers are withdrawn from the soil, there is a minimum disturbance of the soil at this point.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:
1. A sprig planter comprising:
(a) a translatable frame,
(b) a rotatable member carried by said frame,

(c) furrow opening means carried by said frame and mounted forwardly of said rotatable member for movement through soil at a predetermined depth, (d) a feed hopper having an agitator and discharge passageway therein carried by said frame supplying and supporting sprigs successively adjacent the downgoing side of said rotatable member, (e) elongated fingers each being pivotally mounted adjacent one end to said rotatable member at angularly spaced locations with the other end thereof being disposed to move from a position inwardly of said rotatable member to a position outwardly of said rotatable member upon approaching the soil to remove sprigs from said supporting means and press sprigs sequentially into the soil at the bottom of the furrow made by said furrow opening member, (f) cam means carried by said frame of a shape and in position to engage said one end of each finger at the downgoing side of said rotatable member and move said other end of the finger into said furrow upon rotation of said rotatable member, (g) said cam member also being of a shape and in position to release said fingers successively adjacent the lower portion of said rotatable member, (h) means carried by said rotatable member compacting the soil in said furrow subjacent said rotatable member, (i) means returning said other end of each finger to a position inwardly of said rotatable member as said other end is removed from the soil, (j) angularly spaced rotary presser fingers mounted for rotation in said hopper in alignment with said discharge passageway to aid in forcing sprigs through said passageway, (k) a depending rearwardly opening housing carried by said frame and communicating at its upper end with said passageway, and (l) inwardly and downwardly projecting retainer elements adjacent the lower end of said housing restraining discharge of sprigs from said housing until a sprig is forced therefrom by an elongated finger.

2. A sprig planter as defined in claim 1 in which each elongated finger is resilient and a spring member urges each finger into engagement with a sprig over a long length of the sprig to provide a long line or contact between the finger and the sprig engaged thereby.

3. A sprig planter as defined in claim 1 in which the furrow opening means is an elongated vertically extending sword-like member operatively connected to said frame and a horizontally extending depth plate is mounted for vertical adjustment on said sword-like member to determine the depth of the furrow.

4. A sprig planter as defined in claim 1 in which the furrow opening means is carried by a vertically movable frame which is pivotally connected at its forward end to said translatable frame so that said furrow opening means follows the contour of the ground.

5. A sprig planter as defined in claim 1 in which the hopper supplying sprigs successively adjacent the downgoing side of said rotatable member includes;

(a) a feed member mounted within said housing for rotation adjacent the forward side of said rotatable member and subjacent said hopper and having radially extending teeth spaced angularly from each other and in alignment with said fingers, (b) means to rotate said feed member, (c) said teeth extending to and being in vertical alignment with said passageway through said hopper for passing sprigs from said hopper to said feed member.

6. A sprig planter as defined in claim 5 in which the agitator is mounted for rotation in said sprig hopper and drive means is operatively connected thereto for rotating said agitator with the peripheral speed of said agitator being less than the peripheral speed of said feed member.

7. A sprig planter as defined in claim 5 in which said discharge passageway comprises transversely spaced passageways through said hopper and said agitator is mounted for rotation above and between said passageways, said agitator having forwardly converging V-shaped agitator elements as viewed in the direction of rotation of the agitator, disposed to move sprigs toward said passageways.

References Cited

UNITED STATES PATENTS

| 1,924,133 | 8/1933 | Schutmaat | 111—3 |
| 1,972,325 | 9/1934 | Acasio | 111—3 |
| 2,715,882 | 8/1955 | Overstreet | 111—3 |
| 2,889,959 | 6/1959 | Landgraf | 111—3 X |
| 3,026,001 | 3/1962 | Landgraf | 111—3 X |

ROBERT E. BAGWELL, Primary Examiner

U.S. Cl. X.R.

221—42